(12) United States Patent
Jeffs et al.

(10) Patent No.: US 8,186,315 B2
(45) Date of Patent: May 29, 2012

(54) HYDROGEN FUEL ASSIST DEVICE FOR AN INTERNAL COMBUSTION ENGINE AND METHOD

(76) Inventors: Arthur Jeffs, Hilldale, UT (US); Heber Barlow, Hilldale, UT (US)

( * ) Notice: Subject to any disclaimer, the term of this patent is extended or adjusted under 35 U.S.C. 154(b) by 409 days.

(21) Appl. No.: 12/263,076

(22) Filed: Oct. 31, 2008

(65) Prior Publication Data

US 2010/0275858 A1 Nov. 4, 2010

Related U.S. Application Data

(60) Provisional application No. 61/001,564, filed on Nov. 2, 2007.

(51) Int. Cl.
*F02B 43/08* (2006.01)
(52) U.S. Cl. ............. 123/3; 123/1 A; 429/423; 429/424; 429/437; 429/480; 180/167
(58) Field of Classification Search .............. 123/3, 1 A, 123/DIG. 12, 41.51; 429/410, 420, 423, 429/424, 425, 437, 480; 180/167
See application file for complete search history.

(56) References Cited

U.S. PATENT DOCUMENTS

| | | | |
|---|---|---|---|
| 6,427,639 B1* | 8/2002 | Andrews et al. ................ | 123/3 |
| 6,475,655 B1* | 11/2002 | Nakanishi et al. ............ | 429/424 |
| 6,589,683 B2 | 7/2003 | Staats, III | |
| 7,220,501 B2* | 5/2007 | Merzougui et al. ................ | 429/9 |
| 7,309,538 B2* | 12/2007 | Shiraishi et al. .............. | 429/437 |
| 7,386,375 B2* | 6/2008 | Hoch et al. ....................... | 701/22 |
| 2003/0162066 A1* | 8/2003 | Shiraishi et al. ................ | 429/26 |
| 2006/0052916 A1* | 3/2006 | Hoch et al. ....................... | 701/22 |
| 2006/0073372 A1* | 4/2006 | Suh ................................ | 429/35 |
| 2006/0219190 A1 | 10/2006 | Balan et al. | |
| 2007/0023215 A1* | 2/2007 | Ueda ............................. | 180/167 |
| 2007/0044737 A1* | 3/2007 | Lindsey ......................... | 123/41.08 |
| 2007/0051544 A1* | 3/2007 | Fernandez .................... | 180/65.8 |
| 2007/0074680 A1 | 4/2007 | Ross | |
| 2007/0157912 A1 | 7/2007 | Ritter et al. | |
| 2008/0057368 A1* | 3/2008 | McElroy ......................... | 429/26 |
| 2009/0023024 A1* | 1/2009 | Conti et al. ..................... | 429/26 |

OTHER PUBLICATIONS

Reversible fuel cell—Wikipedia, the free encyclopedia, accessed Sep. 5, 2007.
http://ecosoul.org/files/fuelcell/fuelcell.htm, NFCEP—Eco Soul . . . Education, Environment, Energy, Fuel Cells, 2 pages, accessed Sep. 5, 2007. http://www.newtechnologyclub.com/Default.aspx?tabid=411&List=1&ProductID=63&SortField=P..., New Technology Club, 7 pages, accessed Sep. 5, 2007.
www.savefuel.ca/oxy-hydrogen/?gclid+ CPDFnsiJ7o0CFQ3YggodKVChvA, Oxy Hydrogen The Ultimate Fuel Saving Device, pp. 1-14, accessed Aug. 11, 2007.
Johnston, Michael, "Using a fuel call to produce Hydrogen," www.geocities.com/mj_17870/test.html, 2003, 6 pages.

* cited by examiner

*Primary Examiner* — Noah Kamen
*Assistant Examiner* — Long T Tran
(74) *Attorney, Agent, or Firm* — Thorpe North & Western LLP

(57) ABSTRACT

A hydrogen fuel system for an internal combustion engine includes a water reservoir and a fuel cell in fluid communication with the water reservoir. An oxygen line is fluidly coupled to the hydrogen fuel cell and receives and transports oxygen away from the fuel cell. A hydrogen line is fluidly coupled to the fuel cell and receives and transports hydrogen away from the fuel cell. An engine gas interface is fluidly coupled to the oxygen line and the hydrogen line, and operatively coupled to an engine intake. The engine gas interface receives oxygen and hydrogen from the oxygen and hydrogen lines, and introduces the hydrogen and oxygen into the engine intake. A vibration sensor is operatively coupled to the engine gas interface to detect engine vibration of the internal combustion engine, and deactivates the fuel when the sensor does not detect vibration from the engine.

17 Claims, 12 Drawing Sheets

HYDROGEN FUEL ASSIST DEVICE FOR AN INTERNAL COMBUSTION ENGINE AND METHOD

PRIORITY CLAIM

Benefit is claimed of U.S. Provisional Patent Application Ser. No. 61/001,564, filed Nov. 2, 2007 which is herein incorporated by reference in its entirety for all purposes.

BACKGROUND OF THE INVENTION

1. Field of the Invention

The present invention relates generally to internal combustion engines and more particularly to hydrogen fuel additives for improving engine performance.

2. Related Art

Hydrogen can be beneficial as a secondary fuel that can be added to a primary fuel, such as gasoline or diesel fuel for use in internal combustion engines. For example, hydrogen and oxygen, when mixed with the air/fuel mixture of the primary fuel of the engine can increase the performance of the engine by increasing the mileage and fuel economy of the vehicle with respect to the primary fuel. Additionally, hydrogen can also increase the horsepower output of the engine, and reduce the amount of undesirable emissions from the engine. Conveniently, hydrogen and oxygen can be generated through electrolysis of an aqueous solution with the hydrogen and oxygen given off being mixed with the fuel and air supplied to the engine.

Some electrolysis systems have been developed that produce hydrogen and oxygen specifically for use in internal combustion engines. Typically, these systems use electrolysis cells to separate water into hydrogen and oxygen and then draw off the hydrogen and oxygen for combination with the primary air/fuel mixture of the internal combustion engine. Unfortunately, these systems have inherent production and safety issues. For example, typical electrolysis cells usually produce far less hydrogen than is desired for injection into the air/fuel mixture in the engine. Additionally, typical electrolysis cells have a relatively short life span due to the corrosive effects of the aqueous solution in an electrically charged environment. Moreover, the hydrogen and oxygen produced by such electrolysis cells is difficult to separate. Consequently, the hydrogen and oxygen gasses are directed from the cell to the engine in a combined state which can be relatively volatile.

Another issue with typical hydrogen generation systems is that the electrolysis cells often operated in such systems can be run independent from the engine such that the cell can continue to produce explosive hydrogen even when the engine is not running. Producing combustible or explosive hydrogen gas is not desirable if the engine is not running and using up the hydrogen gas as it is produced since the gas can accumulate, combust, or explode if not stored or disposed of properly.

SUMMARY OF THE INVENTION

The inventors of the present invention have recognized that it would be advantageous to develop hydrogen fuel assist device for an internal combustion engine that economically and efficiently produces hydrogen as needed, and minimizes the safety hazard of inadvertent hydrogen combustion when the engine is not running. Additionally, the inventors have recognized that it would be advantageous to develop a reversible hydrogen fuel cell for an internal combustion engine that extracts hydrogen and oxygen from water and separates the hydrogen gas from the oxygen gas in order to reduce the risk of inadvertent combustion or explosion of the hydrogen gas prior to the combustion chambers of the internal combustion engine.

The invention provides for a hydrogen fuel system for an internal combustion engine including a water reservoir and a fuel cell in fluid communication with the water reservoir. An oxygen line is fluidly coupled to the hydrogen fuel cell receives and transports oxygen away from the fuel cell. A hydrogen line is fluidly coupled to the fuel cell stack and receives and transports hydrogen away from the fuel cell. An engine gas interface is fluidly coupled to the oxygen line and the hydrogen line, and operatively coupled to an engine intake. The engine gas interface receives oxygen and hydrogen from the oxygen and hydrogen lines, and introduces the hydrogen and oxygen into the engine intake.

In another aspect, a vibration sensor can be operatively coupled to the internal combustion engine to detect engine vibration of the internal combustion engine, and to deactivate the fuel cell when the sensor does not detect vibration from the engine.

In another aspect, an oxygen separator can be coupled to the oxygen line to receive a mixture of oxygen and water from the fuel cell, and to separate the oxygen from the water.

The present invention also provides for a method for providing hydrogen fuel to vehicle having an internal combustion engine including adding water from a water reservoir to a fuel cell stack positioned in an engine compartment of the vehicle. An electric current from an electricity source of the internal combustion engine can be provided to the fuel cell stack to separate the water into hydrogen and oxygen. Hydrogen from the fuel cell stack can be delivered to an engine gas interface coupled to an intake of the internal combustion engine. The engine gas interface can have a vibration sensor configured to deactivate the fuel cell stack when the vibration sensor does not detect vibration from the engine. The hydrogen can be injected into the intake of the engine to mix the hydrogen with an air and a primary fuel of the engine prior to combustion of the primary fuel in a piston of the engine.

Additional features and advantages of the invention will be apparent from the detailed description which follows, taken in conjunction with the accompanying drawings, which together illustrate, by way of example, features of the invention.

DETAILED DESCRIPTION

Figure 1:
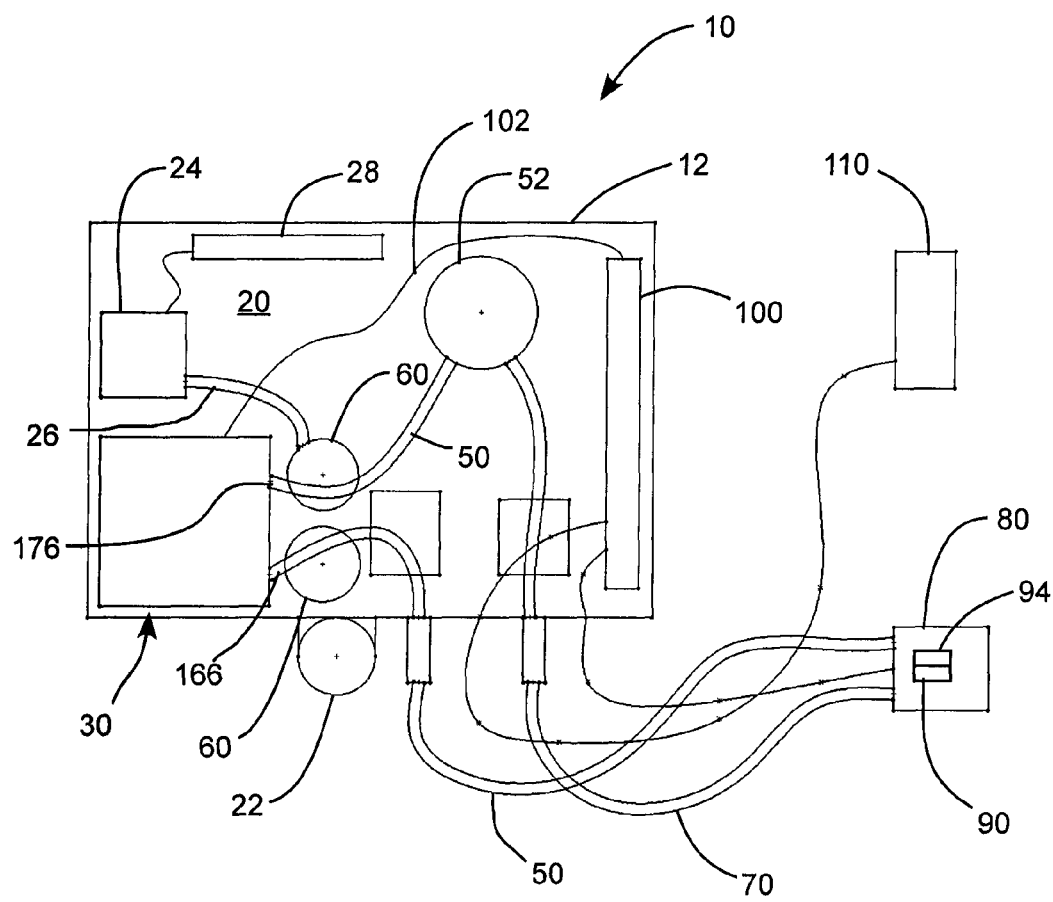
FIG. 1 is an exemplary schematic view of a hydrogen fuel system in accordance with an embodiment of the present invention, shown in a closed configuration.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The embodiments of the present invention described generally herein provide for a hydrogen fuel assist device that can generate hydrogen and oxygen that can be mixed with the air and primary fuel being used in an internal combustion engine in order to improve engine performance. The hydrogen system can include a fuel cell that can be formed by a plurality of fuel cell stacks that include at least one anode, cathode, and a proton exchange membrane (PEM). Water can be introduced into the fuel cell and drawn through each fuel cell stack where the PEM separates the water into hydrogen gas and oxygen gas. A hydrogen line can draw the hydrogen off the fuel cell stacks and a water line can draw off excess water and oxygen. An oxygen separator can receive the excess water and oxygen and can separate the water from the oxygen. The water can be returned to the fuel cell stack and an oxygen line can receive the oxygen. An engine gas interface (EGI) can receive the hydrogen and the oxygen from the hydrogen and oxygen lines. The EGI can inject the hydrogen and oxygen into an intake, such as the air box, manifold, carburetor, and the like, of the internal combustion engine. The hydrogen and oxygen can mix in the intake with the ambient air drawn into the intake. Fuel from the internal combustion engine's fuel tank can be added to the hydrogen, oxygen, and air mixture which can be burned in the engines combustion chambers to increase the performance of the engine.

Figure 2:
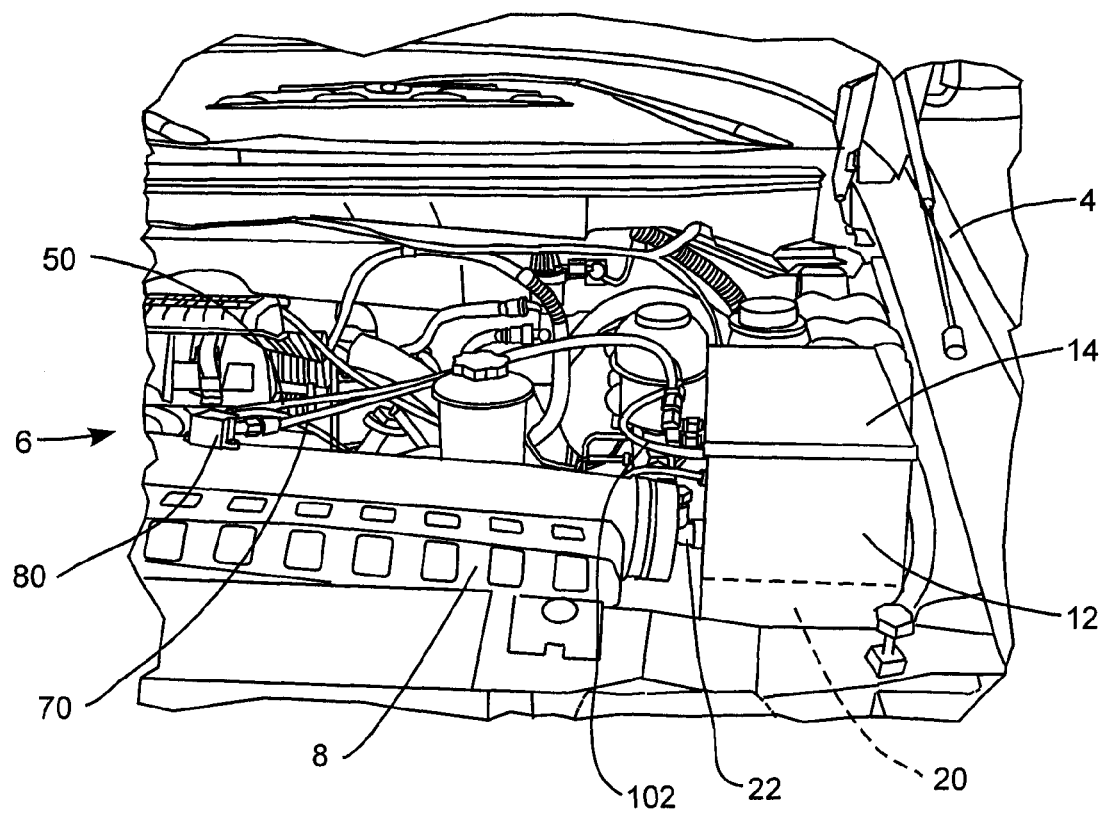
FIG. 2 is a perspective view of housing containing an embodiment of the hydrogen fuel system of FIG. 1, disposed in an engine compartment shown with hydrogen and oxygen lines extending from the housing to an engine gas interface.
Figure 3:
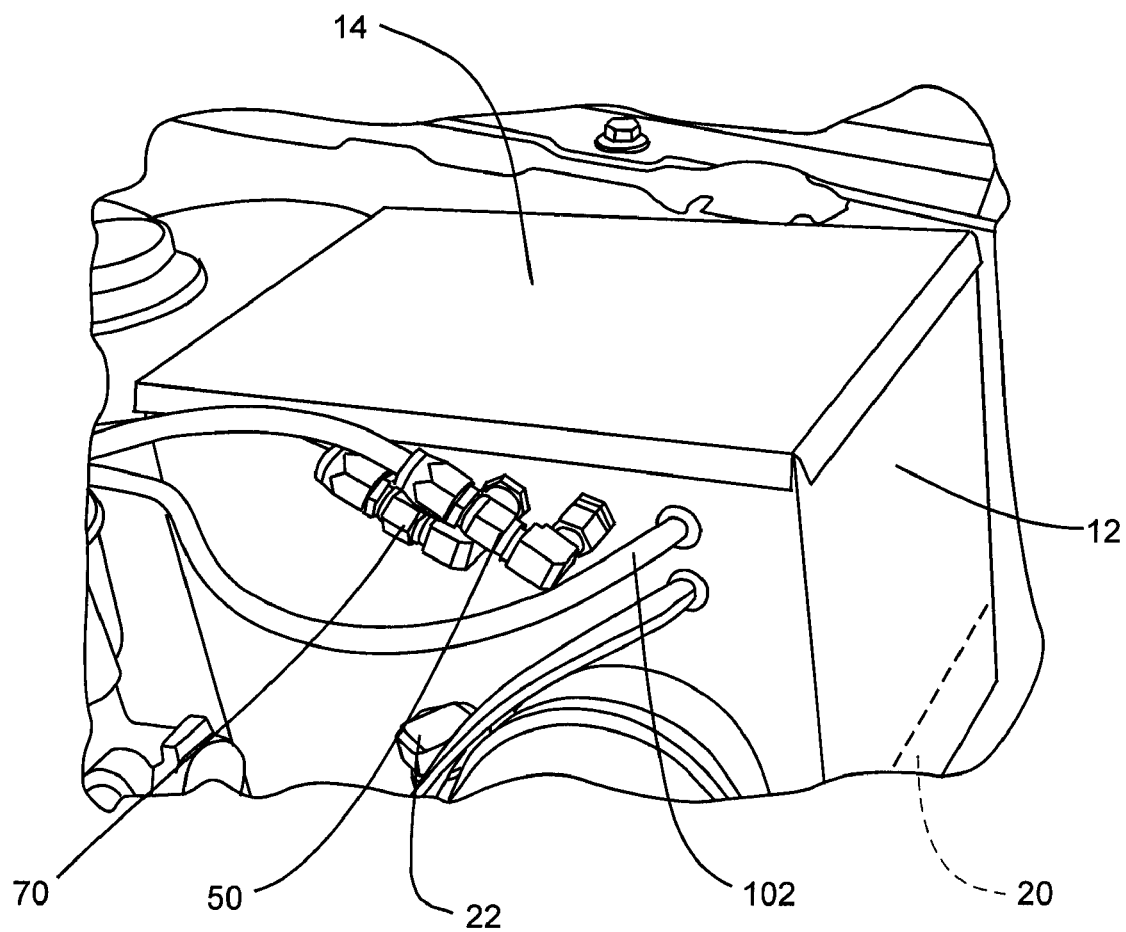
FIG. 3 is a perspective view of housing of FIG. 2, disposed in an engine compartment, shown with hydrogen and oxygen lines extending from the housing.
Figure 4:
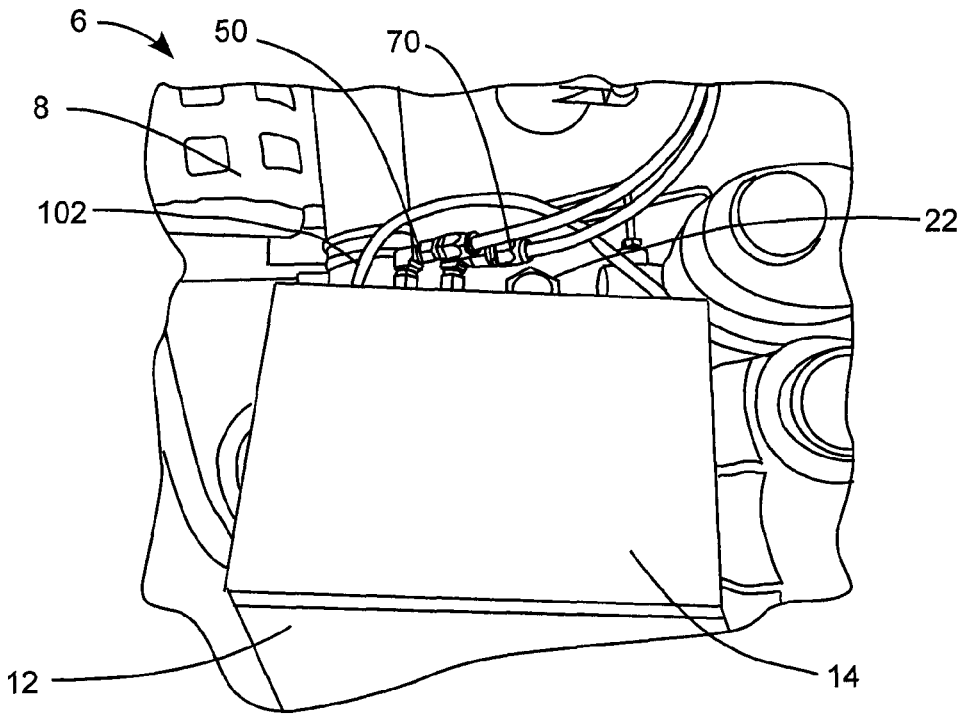
FIG. 4 is a top perspective view of the housing containing the hydrogen fuel system of FIG. 1, disposed in an engine compartment, shown with hydrogen and oxygen lines extending from the housing.

As illustrated in FIGS. 1-5, a hydrogen fuel system, indicated generally at 10, is shown in accordance with an embodiment of the present invention for use in providing hydrogen and oxygen to an internal combustion engine, indicated generally at 6 (FIGS. 2, 4-5), as a secondary fuel source with respect to a primary fuel source such as gasoline or diesel fuel. In one aspect, the internal combustion engine is operatively associated with a motor vehicle 4 (FIG. 2). The hydrogen fuel system 10 can include a water reservoir 20, a fuel cell, indicated generally at 30, an oxygen line 50, a hydrogen line 70, an engine gas interface 80, and a vibration sensor 90.

The water reservoir 20 can be a container that can hold water, such as tap water, distilled water, or the like. In one aspect the water reservoir 20 can be a bottle. In another aspect, the water reservoir 20 can be a quadrangular container sized and shaped to fit within a battery storage area of an engine compartment of a vehicle. In yet another aspect, the water container 20 can hold approximately 1 liter of water and can be disposed in a box or housing containing the hydrogen fuel system 10 underneath the fuel cell 30. It will be appreciated that other sizes and shapes of water containers can be used so long as they fit and can be placed within an open space inside the engine compartment of the vehicle. A fill port 22 can be fluidly couple to the water reservoir 20 to fill the reservoir with water.

A water pump 24 can be coupled to the water reservoir 20. The water pump 24 can pump water from the reservoir to the fuel cell stack 30. The water pump 24 can have a pump controller 28 to selectively engage and disengage the water pump. The pump controller 28 can be an electronic device, such as a programmable microprocessor, that can respond to an electronic signal to engage or disengage the pump 24.

The fuel cell 30 can be in fluid communication with the water reservoir 20 and electrically coupled to an electrical power supply such as the battery of the internal combustion engine. For example, a water line 26 can extend from the water reservoir 20 to the fuel cell 30 and the pump 24 can pump water from the reservoir to the fuel cell through the water line. Additionally, electrical cables 102 can couple the fuel cell 30 to a battery (not shown) of the internal combustion engine 6. Thus, in use, water can be pumped from the water reservoir 20 by the water pump 24 into the fuel cell 30 which can electrolyze the water to separate the water into hydrogen and oxygen when an electrical current is applied to the fuel cell.

Referring to FIGS. 6-9, in one aspect, the fuel cell 30 can be formed by a plurality of fuel cell stacks, indicated generally at 150. The fuel cell 30 can have a cathode 32 and an anode 34 that are electrically coupled to an electricity source such as a vehicle battery (not shown). Additionally, each fuel cell stack 150 can have a cathode 132, an anode 134. The cathodes 132 and anodes 134 of each of the fuel cell stacks 150 can be electrically coupled to the cathode 32 and anode 34 that are coupled to the electricity source. For example, the cathode 32, anode 34, and fuel cell stacks 150 can be welded together to form the fuel cell 30 and the welds can provide a continuous electrical path from the fuel cell cathode 32 to the fuel cell anode 34.

A proton exchange membrane 36 can be disposed between each of the anodes 134 and the cathodes 132 of each of the fuel cell stacks 150. The proton exchange membrane 36 can separate water into hydrogen and oxygen when water is drawn through the proton exchange membrane 36 and an electrical current is applied across the proton exchange membrane. In one aspect, the proton exchange membrane 36 can include polyflouride ionomer material or resin that is coated with catalyst coating, such as platinum, that promotes electrolysis of the water molecule. Other materials known in the art, such as Nafion®, Polybenzimidazole (PBI), phosphoric acid, or the like, can also be used to form the proton exchange membrane 36. When water is separated into hydrogen and oxygen by the proton exchange membrane 36, substantially pure hydrogen collects on one side 36a (FIG. 9) of the proton exchange membrane 36 and oxygen collects on an opposite side 36b (FIG. 9) of the proton exchange membrane 36.

Gaskets, indicated generally at 38, can be disposed between the various parts of the fuel cell stack 150 in order to seal the fuel cell members together to form a water tight fuel cell. The gaskets 38 can be formed of a polycarbonate material.

Additionally, an end plate 40 and a supply plate 42 can be used to complete the fuel cell 30 and to direct fluid flow into, through, and out of the fuel cell 30. The end plate 40 and supply plate 42 can be formed of a composite material such as fiberglass.

Figure 7:
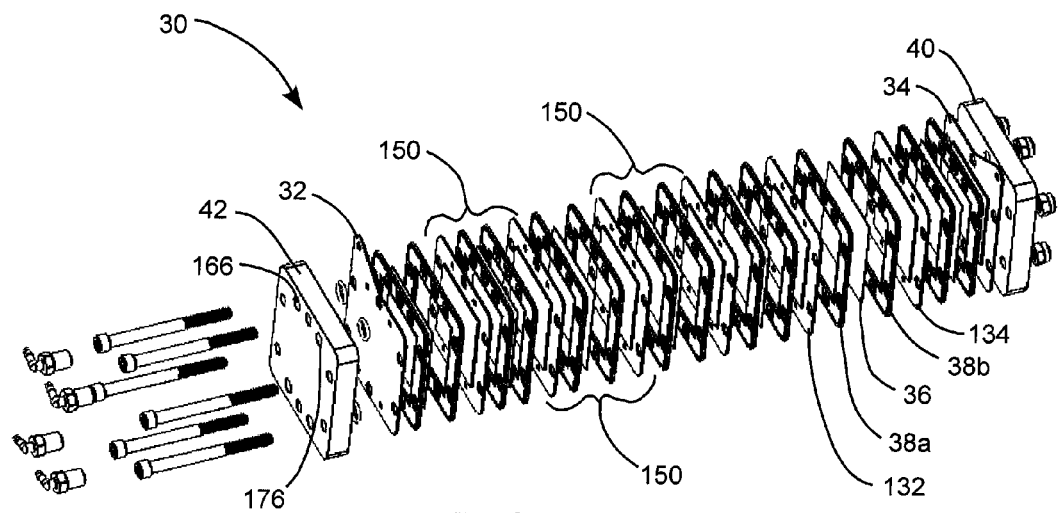
FIG. 7 is an exploded perspective view of the fuel cell of FIG. 6.
Figure 8:
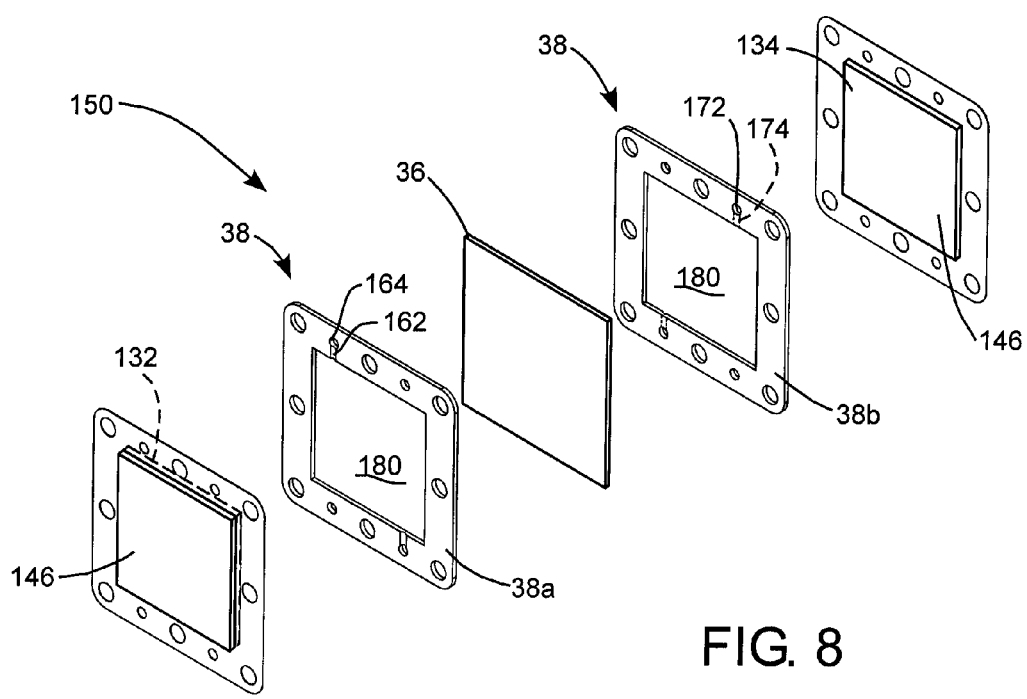
FIG. 8 is an exploded perspective view of one of a plurality of fuel cell stacks that together form the fuel cell of FIG. 6.
Figure 9:
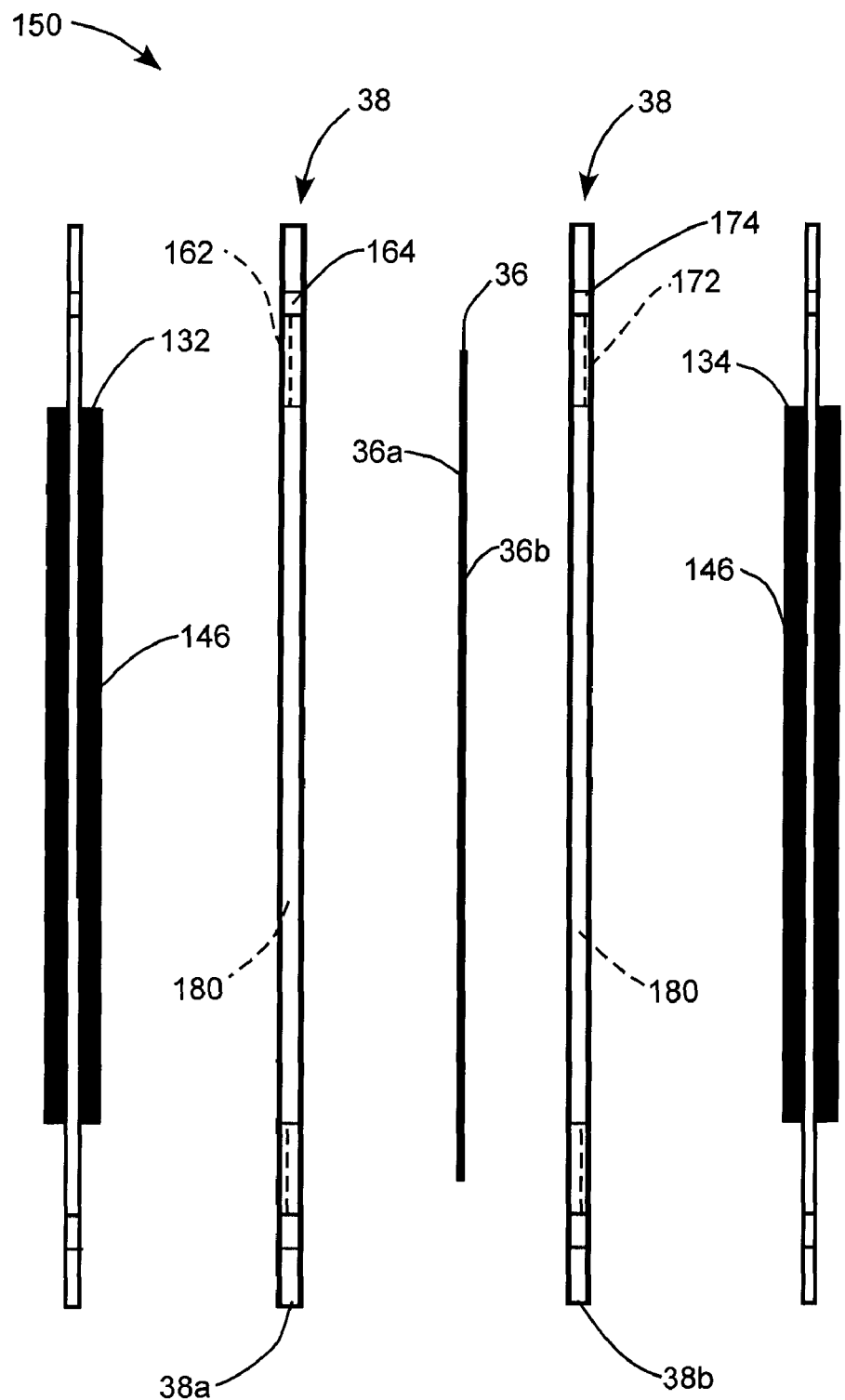
FIG. 9 is an exploded side view of the fuel cell stack of FIG. 8.

The gaskets 38 can be configured to receive and direct the flow of hydrogen or oxygen from the proton exchange membrane 36 to a hydrogen path, indicated by dashed lines at 160 in FIGS. 7 and 8 or oxygen path 170. Thus, the gasket 38a on the side of the proton exchange member that generates the hydrogen can have at least one channel 162 that can receive the hydrogen generated by the PEM 36 and direct the hydrogen to a through hole 164 in the gasket 38a. The through hole 164 in the gasket 38a can be aligned with corresponding through holes in adjacent fuel cell stack components to form the hydrogen path 160 that extends throughout the fuel cell 30 and which allows hydrogen to travel from the fuel cell to a hydrogen outlet 166. The hydrogen outlet 166 can be fluidly coupled to the hydrogen line 70.

Similarly, the gasket 38b on the side of the proton exchange member 36 that generates the oxygen can have at least one channel 172 that can receive the oxygen generated by the PEM 36 and direct the oxygen to a through hole 174 in the gasket 38b. The through hole 174 in the gasket 38b can be aligned with corresponding through holes in adjacent fuel cell stack components to form the oxygen path 170 that extends throughout the fuel cell 30 and which allows oxygen and un-separated water to travel from the fuel cell to an oxygen outlet 176. The oxygen outlet 176 can be fluidly coupled to the oxygen line 50.

In one aspect, each fuel cell stack 150 can include several layers or screen stacks 46 that can form the anodes and cathodes. The screens 46 can filter and aid in separation of the water into hydrogen and oxygen. The screens 46 can include titanium or stainless steel members coated with noble metals such as gold, platinum, silver, and the like. The screens 46 can be welded together and each of the individual fuel cell stacks 150 can be welded together to form the fuel cell. The gaskets 38 can have an aperture 180 that can receive the screen stacks 46 such that the gasket can seal around the screens.

Each screen layer 46 can contribute to the electrical potential of the overall stack. For example, each layer can contribute approximately 2 volts to the overall voltage of the fuel cell stack 150. Additionally, the welds joining the fuel cell stacks 150 can facilitate the flow of electrical current throughout the fuel cell 30 and can provide a substantially continuous electrical pathway across the fuel cell.

In one embodiment, the fuel cell 30 can be a reversible hydrogen fuel cell. For example, as described above, each fuel cell stack 150 can include an anode 32 and a cathode 34 separated by a proton exchange membrane 36. When operating as a fuel cell, hydrogen can be introduced into the fuel cell stack 30 and drawn through the proton exchange membrane 36 where the hydrogen can combine with oxygen to produce water and electricity. The chemical reaction producing the water can generate the electricity that can be drawn off as an electrical current useful for powering electrical equipment. As noted above, each fuel cell stack 150 can produce approximately 2 volts, and the fuel cell 30 can have between about 6 and 7 layers in order to produce about 14 volts, thereby being compatible with the electrical system of a motorized vehicle, such as a car, truck and the like.

Additionally, the fuel cell stack 30 can also be operated in reverse in order to electrolyze water into hydrogen and oxygen, as discussed above. For example, water can be introduced into the fuel cell 30 and an electric current can be applied to the anode 32 and the cathode 34. When the electric current is applied, the water can be drawn through the proton exchange membrane 36 to separate the water into hydrogen and oxygen. Advantageously, because the fuel cell stack 30 has sufficient layers to be compatible with the electrical system of a motorized vehicle, the fuel cell stack can be electrically coupled to the electrical power source of the internal combustion engine 6, such as a battery or generator of the vehicle, and does not require an additional electrical power source.

Returning to FIGS. 1-5, the oxygen line 50 can be fluidly coupled to the fuel cell 30 and can receive and transport oxygen away from the oxygen outlet 176 of the fuel cell. The oxygen line 50 can be formed from a hollow tube, pipes, channels, and the like. In on aspect, the oxygen generated by the fuel cell 30 can be mixed with excess water from the electrolysis process such that oxygenated water, or water having excess oxygen, is produced. In this case, the oxygen line 50 can feed into an oxygen separator 52 that can separate the oxygen from the water. The water can then be returned to the reservoir 20 or fuel cell stack 30 for further electrolysis, and the oxygen can be directed to the engine gas interface 80.

Similarly, the hydrogen line 70 can also be fluidly coupled to the fuel cell 30 to receive hydrogen from the hydrogen outlet 166, and transport hydrogen away from the fuel cell 30. The hydrogen line 70 can be formed from a hollow tube, pipes, channels, and the like.

Figure 10:
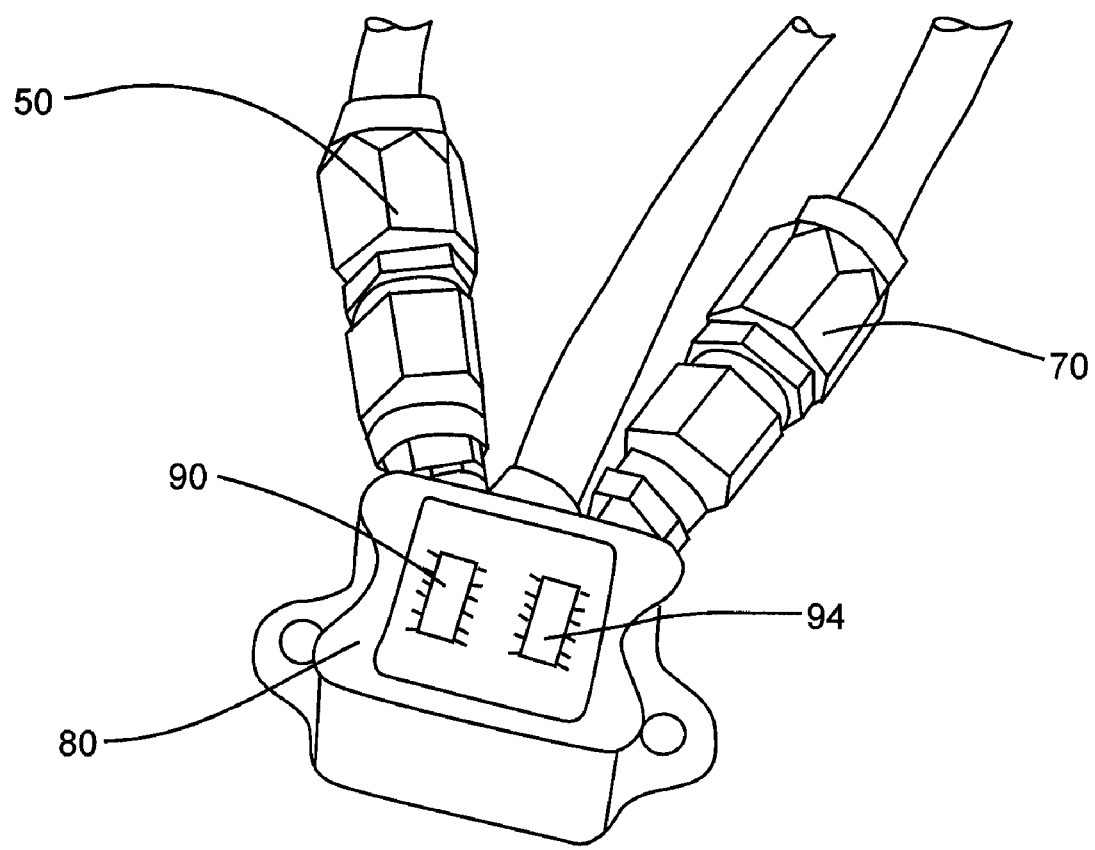
FIG. 10 is a perspective view of an engine gas interface of the hydrogen fuel system of FIG. 1.

Referring to FIGS. 1-2 and 10, the engine gas interface 80 can be fluidly coupled to the oxygen line 50 and the hydrogen line 70 and can receive hydrogen and oxygen from the hydrogen and oxygen lines. The engine gas interface 80 can also be operatively coupled to an engine intake 8 such as an air box, manifold, carburetor, fuel injector, and the like. The engine gas interface 80 can operate to receive hydrogen from the hydrogen line 70 and the oxygen from the oxygen line 50 and introduce the hydrogen and oxygen into the engine intake 8. The hydrogen and oxygen can mix with the air and fuel mixture in the intake 8 prior to entering a piston combustion chamber of the internal combustion engine 6.

It is a particular advantage of the present invention that the oxygen and the hydrogen are substantially pure and kept separated from one another until being mixed in the engine intake 8 just prior to combustion in the engine 6. It will be appreciated that pure hydrogen is less combustible or explosive when not in the presence of oxygen. Thus, the hydrogen system of the present invention minimizes the risk of inadvertent combustion or explosion of the hydrogen by keeping the hydrogen and oxygen separated until just prior to use.

The vibration sensor 90 can be operatively coupled to the internal combustion engine. For example, in one embodiment the vibration sensor can be coupled to the engine gas interface 70. In this way, when the engine gas interface 70 is placed on the engine intake 8, the engine gas interface 70 will receive vibrations from the engine 6 when the engine is running, and the vibrations in the engine gas interface 70 will be detected by the vibration sensor 90.

In one aspect, the vibration sensor 90 can be an accelerometer that can detect vibration of the internal combustion engine 6 when the engine is running. The vibration sensor 90 can operate to deactivate the fuel cell stack 30 when the sensor does not detect vibration from the engine, such as when the engine is not running.

A controller 100 can be operatively coupled to the fuel cell stack 30 and the vibration sensor 90 to activate the fuel cell stack. The controller 100 can include hardware, firmware, and/or software that can be programmed to allow activation of the fuel cell 30 when the vibration sensor detects vibration of the engine, and prevent activation of the fuel cell 30 when the vibration sensor 90 does not detect vibration from the engine 6.

Figure 11:
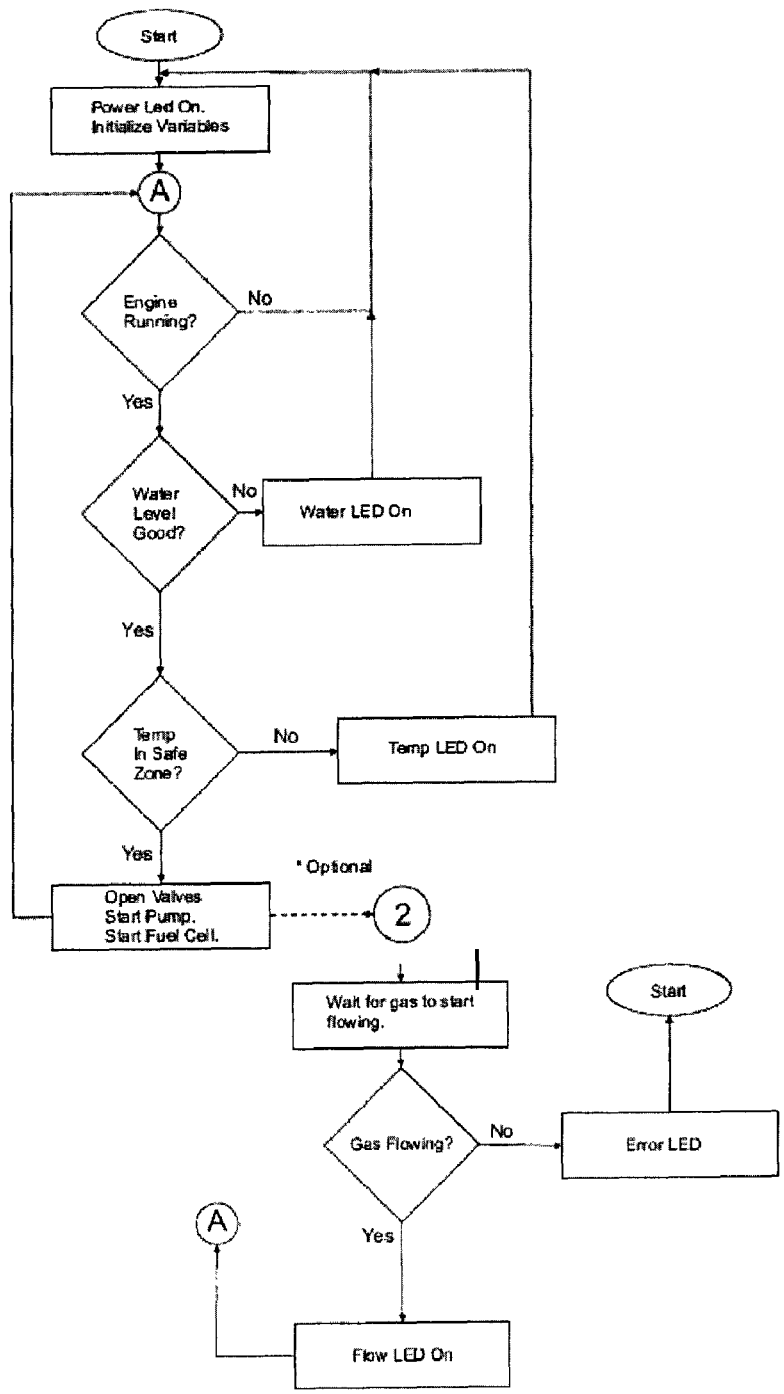
FIG. 11 is a flow chart illustrating the logic of a computer controller of the hydrogen fuel system of FIG. 1.

In one aspect, the controller 100 can be an electronic, programmable device such as a computer, microcomputer, EPROM, integrated circuit board, and the like, that can have a program that can follow the logic illustrated in the flow chart shown in FIG. 11. Thus, the hardware, firmware and/or software of the controller 100 can receive input from the vibration sensor 90 and activate the fuel cell 30 to separate water into hydrogen and oxygen when the vibration sensor detects vibration from the engine 6. Similarly, the controller 90 can deactivate the fuel cell stack 30 when the vibration sensor 90 does not detect vibration from the engine 6. In this way, the hydrogen system 10 of the present invention advantageously minimizes the risk of inadvertent combustion or explosion of hydrogen because the fuel cell stack supplies hydrogen only on demand from the controller and does not store hydrogen or produce hydrogen when the engine is not running.

Additionally, the controller 100 can be coupled to other sensors to detect and monitor the status of other components of the hydrogen fuel system 10. For example, the controller 100 can monitor the water level of the water reservoir 20 and the temperature of the water reservoir and the fuel cell 30 in order to prevent damage to the fuel cell 30 or fuel cell components from freezing.

Returning again to FIGS. 1-5, the hydrogen fuel system 10 can also include an impact sensor 94. In one aspect, the impact sensor 94 can be an accelerometer that can be operatively coupled to the fuel cell 30. The impact sensor 94 can be coupled to the vibration sensor 90. The impact sensor 94 can detect an impact to the vehicle and deactivate the fuel cell 30 if an impact is detected in order to prevent the production of hydrogen in a vehicle that has been disabled by a collision.

Drain valves 60 can be fluidly coupled to drain the water, oxygen and hydrogen from the fuel cell stack 30 and the hydrogen line 70 and the oxygen line 50. For example, the drain valves 60 can be solenoid valves coupled to the controller 100 such that the controller can activate the solenoid valves to drain system when selected by the user or when adverse operating conditions are detected by the sensors coupled to the controller. The drain valves 60 can also include check valves to reduce backflow of hydrogen or oxygen into the fuel cell 30.

It is another particular advantage of the hydrogen fuel system described herein that the fuel cell 30, the water pump 24, the oxygen separator 52, the controller 100, and the water reservoir 20 can be housed together in a single housing as a turn-key or off the shelf unit. In one aspect, the fuel cell 30, the pump 24, the oxygen separator 52, the controller 100, and the water reservoir 20 can be contained in a housing 12 sized and shaped to fit within a space the size of an automotive battery. In another aspect, the water reservoir 20 and fuel cell 30 can be disposed in a common housing 12 with the water reservoir 20 occupying a lower portion of the housing 12 and the fuel cell 30 disposed on top of the water reservoir 20.

Figure 5:
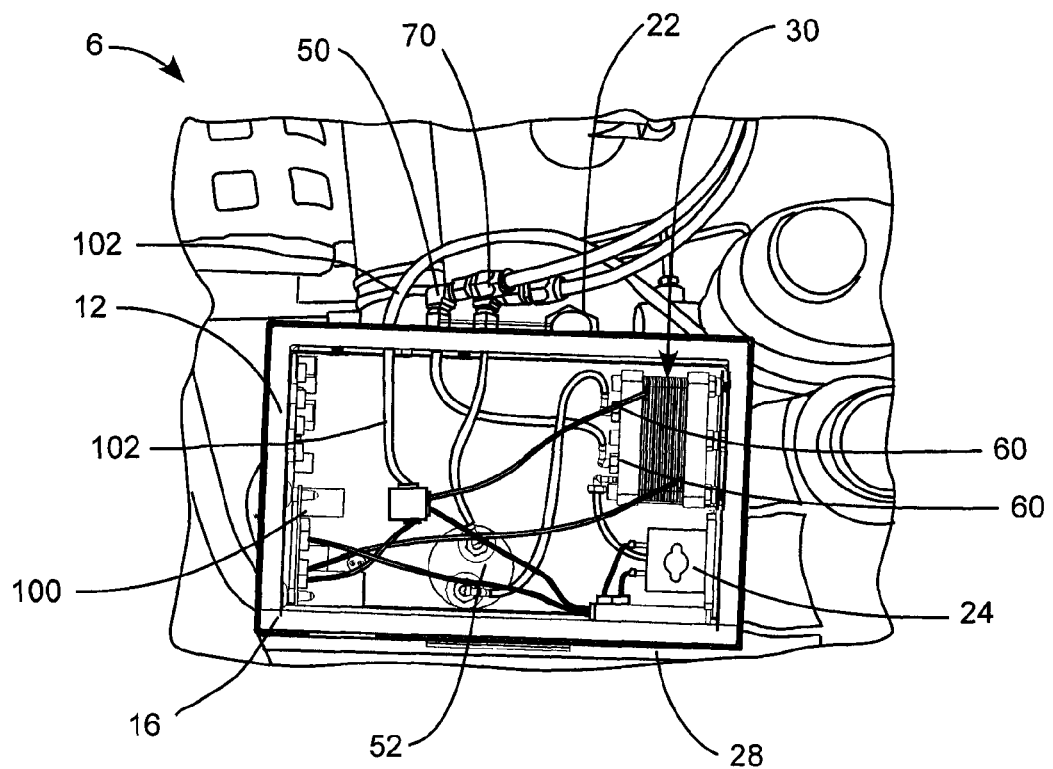
FIG. 5 is a top perspective view of housing containing the hydrogen fuel system of FIG. 1, disposed in an engine compartment, shown with a lid on the housing removed.
Figure 6:
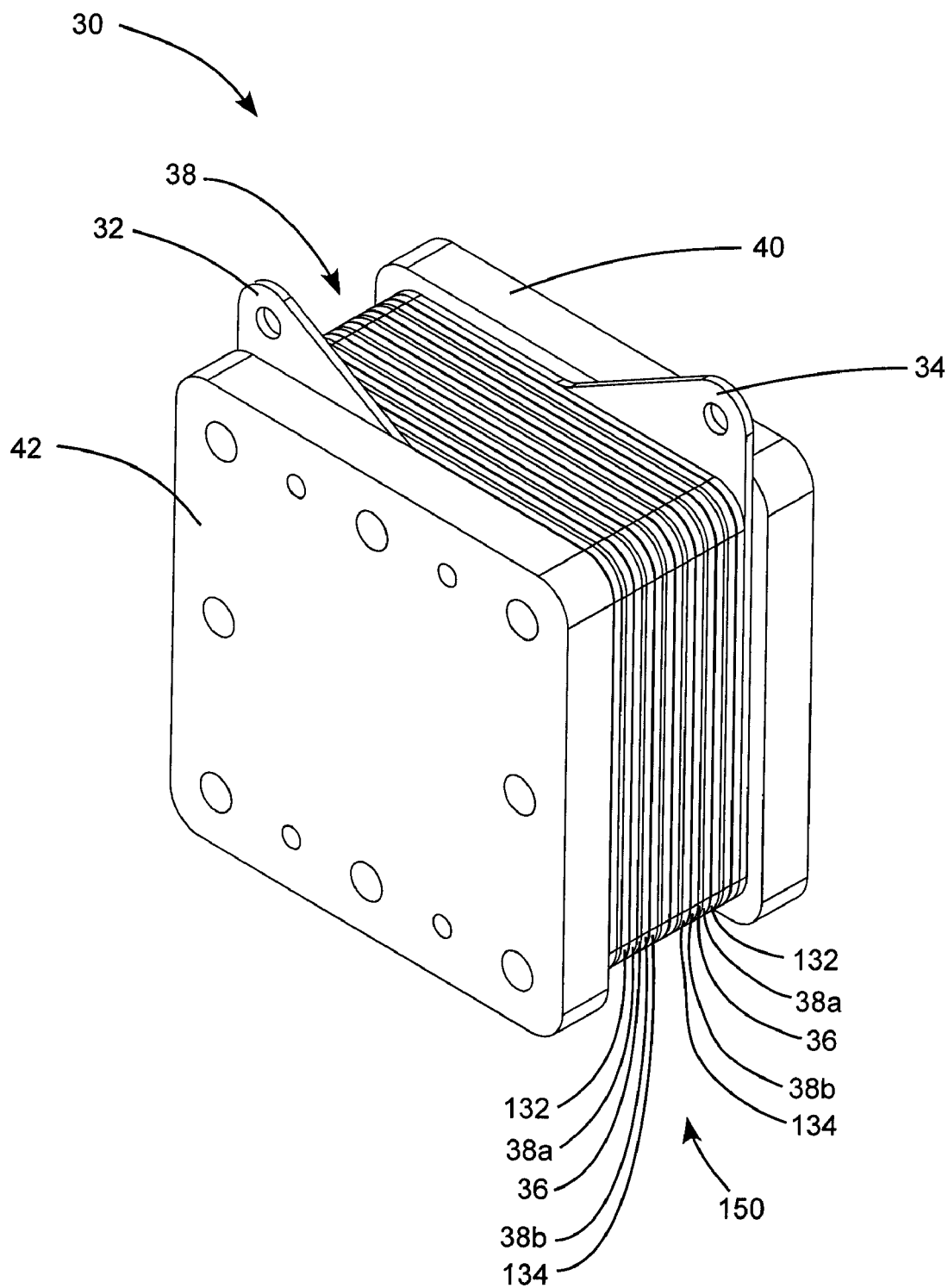
FIG. 6 is a perspective view of a fuel cell of the hydrogen fuel system of FIG. 1.

The housing 12 can have an insulation layer 16 (FIG. 5). The insulation layer 16 can help to maintain an above freezing temperature of the fuel cell to reduce the likelihood of damage to the fuel cell due to freezing.

Additionally, the housing 12 can have a lid 14. The lid 14 can also have means for insulating the fuel cell 30. For example, in one aspect the lid 14 can have an insulative blanket to trap and retain heat. In another aspect, the lid 14 can include liquid antifreeze that can maintain a relatively constant temperature.

Figure 12:
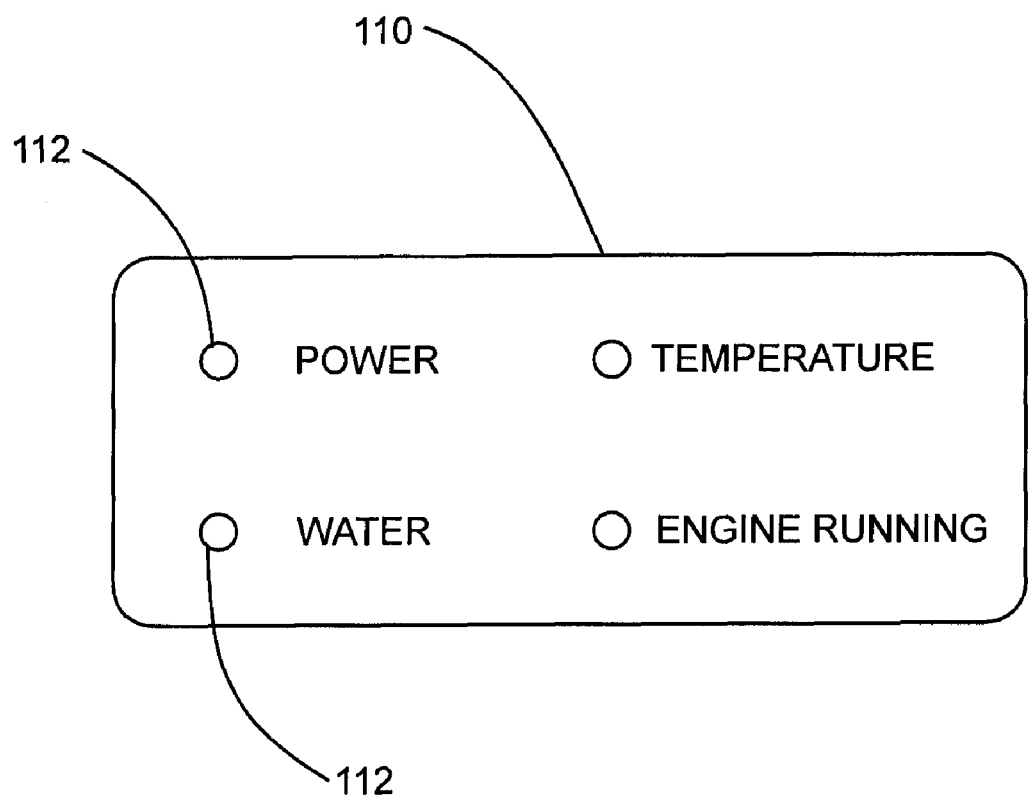
FIG. 12 is a front view of an in-vehicle display of the hydrogen fuel system of FIG. 1.

As shown in FIG. 12, the hydrogen fuel system 10 can also include an in-vehicle display 110. The in-vehicle display 110 can be operatively coupled to the controller 100. The in-vehicle display can indicate the operational status of the fuel cell 30 to operators positioned in the vehicle. In one aspect, the in-vehicle display 110 can indicate the acceptable status of the water level of the reservoir, vibration of the engine, and a temperature of the fuel cell. For example, the in-vehicle display 110 can include LED indicators 112 that can light green for an acceptable status and red for an unacceptable status. Additionally, in another aspect, the in-vehicle display 110 can be a wireless display that can receive and display information transmitted from the controller 100.

In use, a user can enter the cab of a vehicle and start the internal combustion engine of a vehicle. The user can then activate the in-vehicle display. The in-vehicle display can register the status of the water reservoir, the temperature of the fuel cell, and vibration from the engine. If the water reservoir is too low, the temperature of the fuel cell is too low, or vibration from the engine is not detected, the controller can prevent the activation of the fuel cell. If the status of the water reservoir, the temperature of the fuel cell and the vibration from the engine are all acceptable, the user can then activate the fuel cell stack. The pump can then pump water from the water reservoir into the fuel cell stack. An electric current can be applied to the anode and cathode of the fuel cell stack and the water being drawn through the PEM of the fuel cell stack can be separated into hydrogen and oxygen. The hydrogen can enter the hydrogen line and the oxygen along with excess water can enter the oxygen line. The water and oxygen can enter an oxygen separator that can separate the oxygen from the water. The oxygen can reenter the oxygen line and the water can be sent back to the fuel cell stack for further electrolysis. The hydrogen and oxygen can then travel through the hydrogen and oxygen lines to the engine gas interface. The engine gas interface can be coupled to an engine intake and can inject the hydrogen and engine gas intake into the air/fuel mixture of air drawn into the intake through the air filter and the fuel from the fuel tank of the vehicle. The hydrogen and oxygen can mix with the air/fuel mixture and can then enter the chamber of a piston of the engine. The piston can be fired to combust the air/fuel-hydrogen/oxygen mixture. In this way, the hydrogen fuel system can add hydrogen as a secondary fuel to the primary fuel of the vehicle, thereby advantageously increasing the performance of the internal combustion engine.

Figure 13:
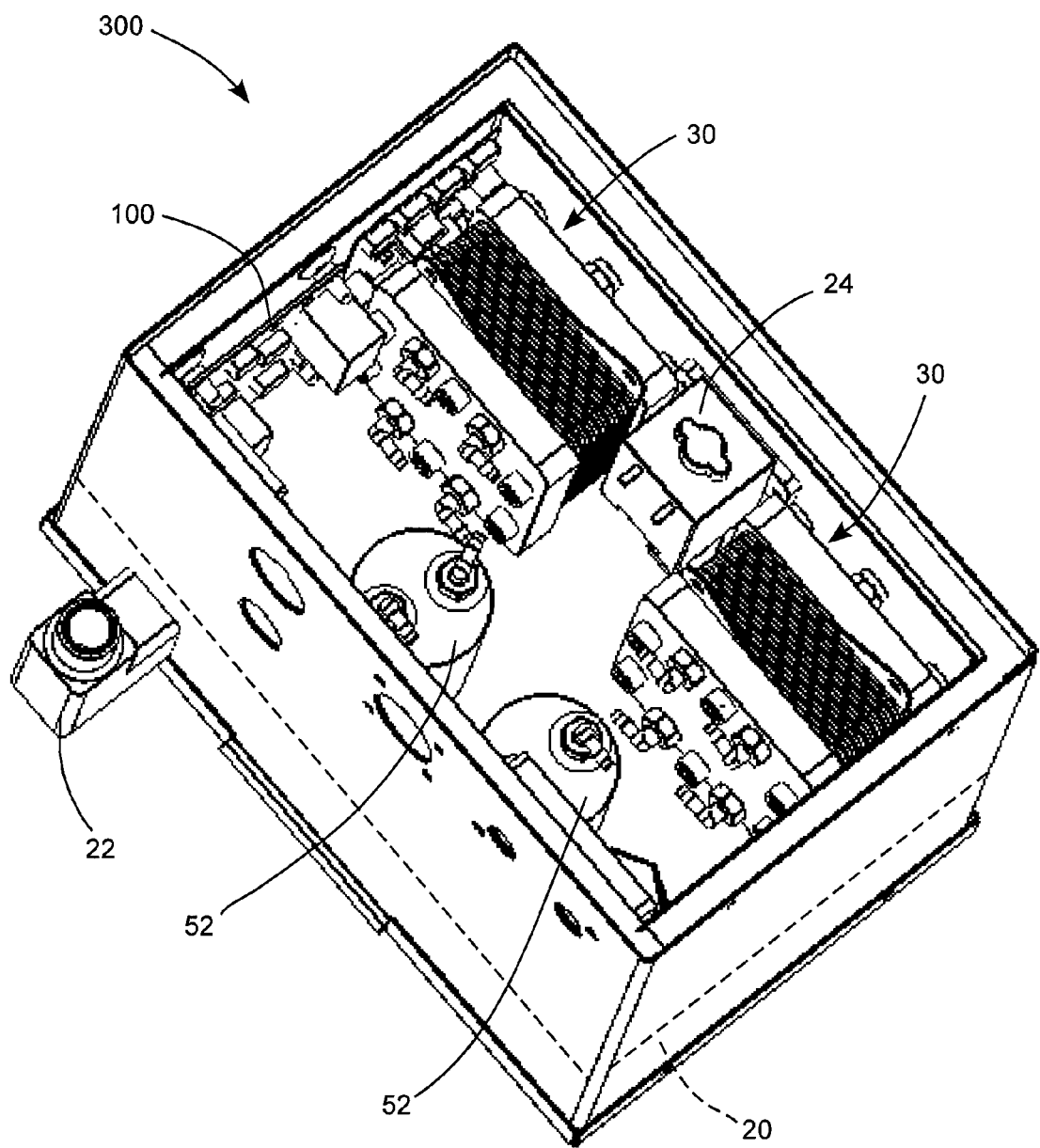
FIG. 13 is a perspective view of a hydrogen fuel system in accordance with another embodiment of the present invention.
Figure 14:
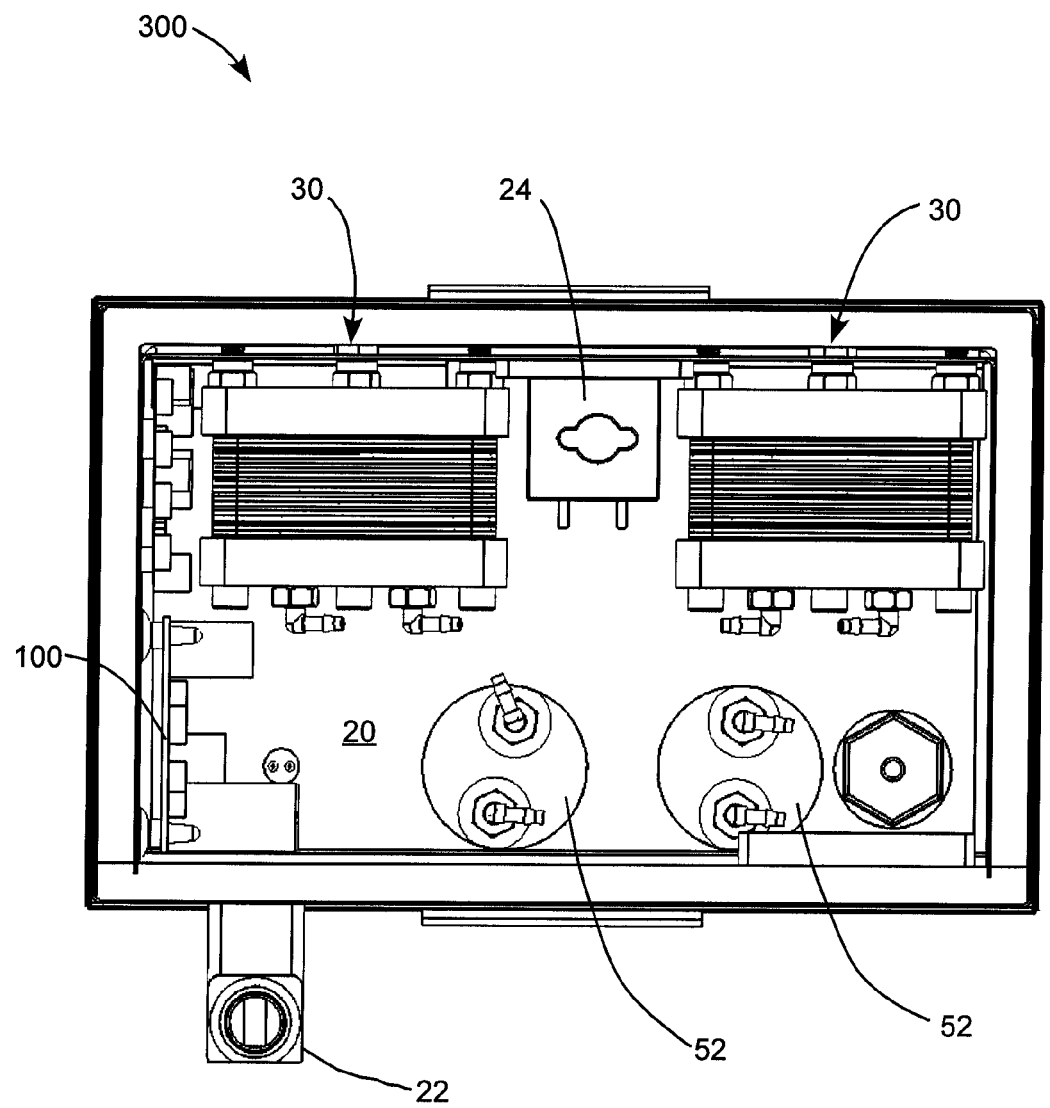
FIG. 14 is a top view of the hydrogen fuel system of FIG. 13.

As illustrated in FIGS. 13-14, a hydrogen fuel system, indicated generally at 300, is shown in accordance with another embodiment of the present invention for use in providing hydrogen and oxygen to an internal combustion engine as a secondary fuel source with respect to a primary fuel source such as gasoline or diesel fuel. The fuel system 300 can be similar in many respects to the hydrogen fuel system 10 described above and shown in FIGS. 1-11. The hydrogen fuel system 300 can include a water reservoir 20, a pair of fuel cells 30, indicated generally at 330, pair of oxygen separators 52, a water pump 24 and a controller 100.

It will be appreciated that the concepts of the present invention can be used with any internal combustion engine that has an electrical power source such as a battery. Accordingly, the hydrogen fuel system 300 can be used with larger automotive vehicles such as semi tractor trailers and the like. Advantageously, the hydrogen fuel system 300 has a pair of fuel cells 30, which can produce more hydrogen for engines with larger displacement.

The present invention also provides for a method for providing hydrogen fuel to vehicle having an internal combustion engine including adding water from a water reservoir to a fuel cell stack positioned in an engine compartment of the vehicle. An electric current from an electricity source of the internal combustion engine can be provided to the fuel cell stack to separate the water into hydrogen and oxygen. Hydrogen from the fuel cell stack can be delivered to an engine gas interface coupled to an intake of the internal combustion engine. The engine gas interface can have a vibration sensor configured to deactivate the fuel cell stack when the vibration sensor does not detect vibration from the engine. The hydrogen can be injected into the intake of the engine to mix the hydrogen with a air and a primary fuel of the engine prior to combustion of the primary fuel in a piston of the engine.

The present invention also provides for a method for retrofitting an internal combustion engine of a vehicle with a hydrogen fuel assist system including securing a fuel cell stack within an engine compartment of the vehicle. The fuel cell stack can separate water into hydrogen and oxygen. A water reservoir can be coupled to the fuel cell stack to provide water to the fuel cell stack. An engine gas interface can be coupled to an intake of the engine. The engine gas interface can have a vibration sensor configured to deactivate the fuel cell stack when the vibration sensor does not detect vibration from the engine. A hydrogen line can be extended between the fuel cell stack and the engine gas interface to provide hydrogen from the fuel cell stack to the intake of the engine. The hydrogen can mix in the engine intake with air and fuel from a fuel tank of the engine prior to combustion in a piston of the engine.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. A hydrogen fuel system for an internal combustion engine, comprising:
   a water reservoir;
   a fuel cell formed from a plurality of fuel cell stacks in fluid communication with the water reservoir, each fuel cell stack having at least one cathode, at least one anode and a proton exchange membrane for separating water into hydrogen and oxygen when an electrical current is applied across the at least one cathode and at least one anode;
   a hydrogen path extending through the fuel cell and fluidly coupled to each of the plurality of fuel cell stacks to receive substantially pure hydrogen from each of the fuel cell stacks and transport the hydrogen to a hydrogen outlet in the fuel cell;
   an oxygen path extending through the fuel cell and fluidly coupled to each of the plurality of fuel cell stacks to receive oxygen from each of the fuel cell stacks and transport the oxygen to an oxygen outlet in the fuel cell;
   a hydrogen line fluidly coupled to the hydrogen outlet to receive and transport hydrogen away from the fuel cell;
   an oxygen line fluidly coupled to the oxygen outlet to receive and transport oxygen away from the fuel cell; and
   an engine gas interface fluidly coupled to the oxygen line and the hydrogen line, and operatively coupled to an engine intake, the engine gas interface being operable to receive hydrogen from the hydrogen line and the oxygen from the oxygen line and introduce the hydrogen and oxygen into the engine intake; wherein
   each fuel cell stack further includes at least one gasket disposed between two components of the fuel cell stack, the gasket including:
   i) a through hole formed therein for passage of hydrogen or oxygen through the gasket; and
   a channel formed in the gasket adjacent the through hole and extending from the through hole to an aperture surrounded by the gasket, the channel being sized and shaped to allow passage of the hydrogen or oxygen to or from the through hole to or from the edge of the gasket.

2. The system of claim 1, further comprising:
   a vibration sensor operatively coupled to the internal combustion engine and the fuel cell, the vibration sensor being operable to detect engine vibration from the internal combustion engine, and to deactivate the fuel cell when the sensor does not detect vibration from the engine.

3. The system of claim 2, further comprising:
   a controller operatively coupled to the fuel cell and the vibration sensor to activate the fuel cell to separate water into hydrogen and oxygen when the vibration sensor detects vibration from the engine and to deactivate the fuel cell when the vibration sensor does not detect vibration from the engine.

4. The system of claim 3, further comprising:
   an in-vehicle display operatively coupled to the controller and configured to indicate the operational status of the fuel cell including a water level of the reservoir, vibration of the engine, and a temperature of the fuel cell.

5. The system of claim 1, further comprising:
   an oxygen separator fluidly coupled to the oxygen line between the fuel cell and the engine gas interface to receive oxygenated water from the oxygen line and separate the oxygenated water into water and oxygen.

6. The system of claim 1, wherein the fuel cell is electrically coupled to an electrical power source of the internal combustion engine.

7. The system of claim 1, wherein the fuel cell is a reversible hydrogen fuel cell configured to separate hydrogen and oxygen from water when an electric current is applied to the fuel cell, and to generate an electric current when hydrogen is introduced into the fuel cell.

8. The system of claim 1, further comprising a water pump fluidly coupled to between the water reservoir and the fuel cell to pump water from the water reservoir to the plurality of fuel cell stacks forming the fuel cell.

9. The system of claim 1, further comprising an impact sensor operatively coupled to the fuel cell and configured to deactivate the fuel cell when an impact is detected.

10. The system of claim 1, wherein the water reservoir and fuel cell are disposed in a common housing with the water reservoir occupying a lower portion of the housing and the fuel cell disposed on top of the water reservoir.

11. The system of claim 1, wherein each fuel cell stack further includes:
a first and second stack of screens;
a proton exchange member disposed between the first and second stack of screens and having a first side and second side;
a first gasket disposed between the first stack of screens and the first side of the proton exchange member; and
a second gasket disposed between the second stack of screens and the second side of the proton exchange member.

12. The system of claim 11, wherein the first stack of screens forms the cathode and the second stack of screens forms the anode of each of the fuel cell stacks.

13. The system of claim 11, wherein the first gasket further includes:
an aperture sized and shaped to receive the first stack of screens, the first gasket forming a perimeter around the aperture;
a through hole positioned on the perimeter to align with corresponding through holes in the first stack of screens and the second gasket to form a path for hydrogen generated by the fuel cell stack; and
a channel extending from the aperture to the through hole, the channel being sized and shaped to receive and direct hydrogen from the proton exchange member to the path formed by the through hole.

14. The system of claim 11, wherein the second gasket further includes:
an aperture sized and shaped to receive the second stack of screens, the second gasket forming a perimeter around the aperture;
a through hole positioned on the perimeter to align with corresponding through holes in the second stack of screens and the second gasket to form a path for oxygen generated by the fuel cell stack; and
a channel extending from the aperture to the through hole, the channel being sized and shaped to receive and direct oxygen from the proton exchange member to the path formed by the through hole.

15. A hydrogen fuel cell for use in a hydrogen fuel system for an internal combustion engine, comprising:
a plurality of fuel cell stacks, each fuel cell stack including at least:
a stack of screens;
a proton exchange member disposed adjacent the stack of screens; and
a gasket, disposed adjacent the proton exchange member, the gasket including:
an aperture sized and shaped to receive the stacks of screens, the gasket forming a perimeter around the aperture;
a through hole positioned on the perimeter to form a path through the gasket for hydrogen or oxygen generated by the fuel cell stack; and
a channel, extending from the aperture to the through hole, the channel being sized and shaped to receive and direct hydrogen or oxygen from the aperture to the through hole.

16. The fuel cell of claim 15, wherein the gasket includes a generally planar configuration, and wherein the through hole extends through the plane of the gasket, and wherein the channel extends along a face of the plane of the gasket.

17. The fuel cell of claim 15, wherein the channel of the gasket extends substantially orthogonally to the through hole of the gasket.

* * * * *